United States Patent
Butera et al.

(10) Patent No.: US 7,318,649 B2
(45) Date of Patent: Jan. 15, 2008

(54) OUTER REAR-VIEW MIRROR UNIT FOR A MOTOR-VEHICLE WITH SHAPE MEMORY ACTUATING MEANS

(75) Inventors: Francesco Butera, Turin (IT); Stefano Alacqua, Rivoli Cascine Vica (IT); Alessandro Zanella, Turin (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 0 days.

(21) Appl. No.: 11/433,691

(22) Filed: May 15, 2006

(65) Prior Publication Data
US 2006/0268439 A1    Nov. 30, 2006

(30) Foreign Application Priority Data
May 27, 2005    (EP) ................... 05425379

(51) Int. Cl.
*G02B 5/08* (2006.01)
(52) U.S. Cl. ...................... 359/849; 359/877
(58) Field of Classification Search ........... 359/843, 359/877, 846, 849, 871, 872
See application file for complete search history.

(56) References Cited

U.S. PATENT DOCUMENTS 4,372,177 A * 2/1983 Yamana ............... 74/502.1
5,052,792 A * 10/1991 McDonough ............ 359/877
2004/0156129 A1 * 8/2004 Diaz ...................... 359/843

FOREIGN PATENT DOCUMENTS

| EP | 0 173 433 | 3/1986 |
| EP | 0 897 831 A2 | 2/1999 |
| EP | 0 897 831 B1 | 3/2001 |
| WO | WO 2004/035351 | 4/2004 |

* cited by examiner

Primary Examiner—Euncha P. Cherry
(74) Attorney, Agent, or Firm—Nixon & Vanderhye P.C.

(57) ABSTRACT

An outer-rearview-mirror unit for a motor vehicle comprises an electrical switching device with a number of positions, which controls electrical supply of a plurality of shape-memory wires that control oscillation of the reflecting plate of the mirror. The electrical switching device has a single control lever with a number of positions projecting from a support, which, in the mounted condition of the mirror, is in a position coinciding with that of the base of the mirror, on the inside of the passenger compartment of the motor vehicle.

4 Claims, 3 Drawing Sheets

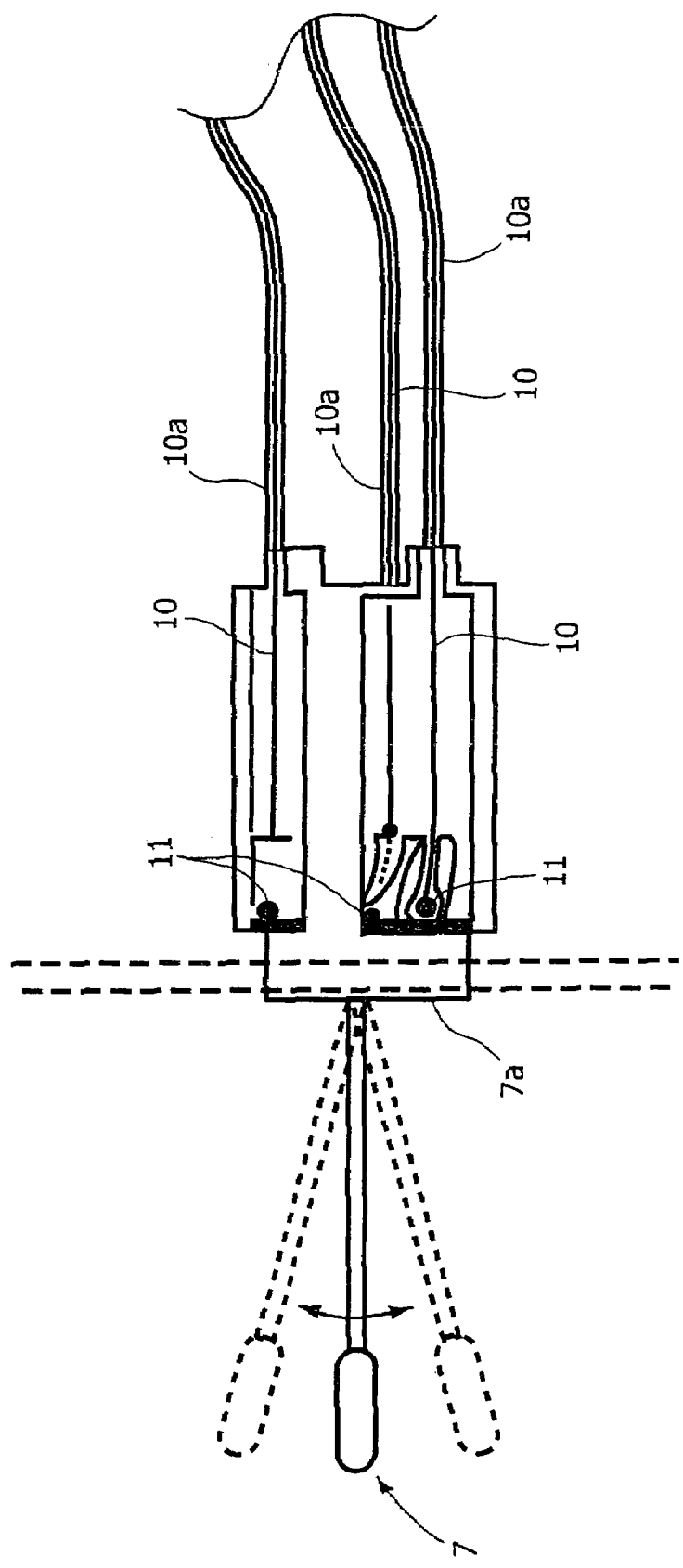

OUTER REAR-VIEW MIRROR UNIT FOR A MOTOR-VEHICLE WITH SHAPE MEMORY ACTUATING MEANS

BACKGROUND OF THE INVENTION

The present invention relates to an outer-rearview-mirror unit for a motor vehicle, of the type comprising a mirror body, provided with a base designed to be mounted on the outer surface of a motor vehicle, adjacent to a side window, a support for a reflecting plate mounted oscillating in the mirror body, and an electrical switching device with a number of positions, which controls electrical supply of a plurality of shape-memory wires connected to the oscillating support, for controlling oscillation of the oscillating support in order to orient the reflecting plate.

A rearview-mirror unit of the type indicated above is described and illustrated in the European patent application EP-A-0 897 831 filed in the name of the present applicant.

SUMMARY OF THE INVENTION

The purpose of the present invention is to provide a rearview-mirror unit of the type indicated above which will have an extremely simple structure and reduced overall dimensions and which, above all, will simplify the operations of installation of the unit on the motor vehicle avoiding, in particular, any laying of wiring for connection of the shape-memory actuating means with the electrical switching device used for controlling adjustment of the mirror.

With a view to achieving the above purpose, the subject of the invention is an outer-rearview-mirror unit presenting all the characteristics indicated above and furhter characterized in that the aforesaid electrical switching device that controls electrical supply to the shape-memory wires has a single control lever with a number of positions projecting from a support, which, in the mounted condition of the mirror, is in a position coinciding with that of the base of the mirror, on the inside of the passenger compartment of the motor vehicle.

In practice, the device according to the invention presents to the user, once installed on the motor vehicle, like those devices for adjustment of the outer mirror with manual actuation, in which a control lever for orientation of the mirror is simply provided in a position corresponding to the mirror, on the inside of the passenger compartment of the motor vehicle. In said solutions with manual actuation, the aforesaid lever controls a plurality of flexible cables (usually three), which in turn control oscillation of the support of the reflecting plate. The device according to the invention enables an electrical actuation for adjustment of the mirror. Even so, the control lever for adjustment of the mirror is provided, as in manual-actuation devices, directly on the inside of the motor vehicle, in a position corresponding to the position of assembly of the mirror. Said solution on the one hand enables electrical actuation of the movement of adjustment and on the other hand renders the operation of installation of the unit on the motor vehicle extremely simple in so far as, unlike known solutions with electrical actuation, the member for controlling adjustment is not set at a distance from the mirror (for example, on the armrest of the door or on the central console between the two front seats of the motor vehicle).

In a preferred embodiment, the control lever of the electrical switching device is of the joy-stick type, with a neutral central position and a plurality of peripheral positions of activation of the shape-memory wires. Preferably, for each shape-memory wire (the typical case is that of three wires) the control lever moreover has a position of mechanical activation, located beyond the position of electrical activation. In other words, once the lever has reached the first position of electrical activation, it controls a respective shape-memory wire. Once it has exceeded said position and has reached the position of mechanical actuation, the same wire is actuated mechanically, in a way similar to a traditional mechanical transmission. The device according to the invention hence always enables adjustment of the mirror envisaging a mechanical adjustment to fall back on in the event of failure of the electrical supply.

In the case of operation with electrical actuation, whenever the control lever is shifted in the position of electrical activation of a respective shape-memory wire, it enables supply of current through said wire, which is heated by the Joule effect and changes phase reducing its length and consequently causing a corresponding movement of the support of the reflecting plate of the mirror.

BRIEF DESCRIPTION OF THE DRAWINGS

Further characteristics and advantages of the invention will emerge from the ensuing description with reference to the annexed plate of drawings, which are provided purely by way of non-limiting example and in which:

FIG. 5 is a partial view of a cross section of a detail of the mirror unit according to the invention.

DETAILED DESCRIPTION OF THE INVENTION

Figure 1:
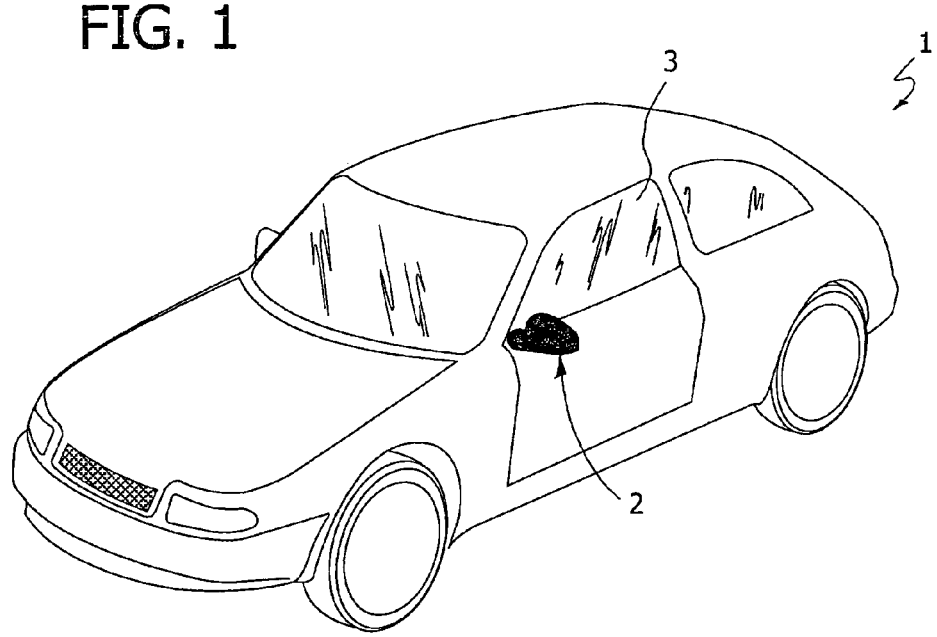
FIG. 1 is a schematic view of a motor vehicle in which the position of assembly of an outer rearview unit is shown.

In FIG. 1, the reference number 1 indicates a motor vehicle provided with an outer rearview mirror 2 mounted on the driver side of the motor vehicle, on the outside thereof, in a position corresponding to the front bottom angle of the left-hand side window 3. In the present description, the mirror unit according to the invention will be described with reference to a left-hand mirror, it being evident that the invention is applicable in an altogether similar way to a right-hand mirror. Furthermore, the mirror according to the invention can be provided on a car as well as on any other type of motor vehicle.

Figure 2:
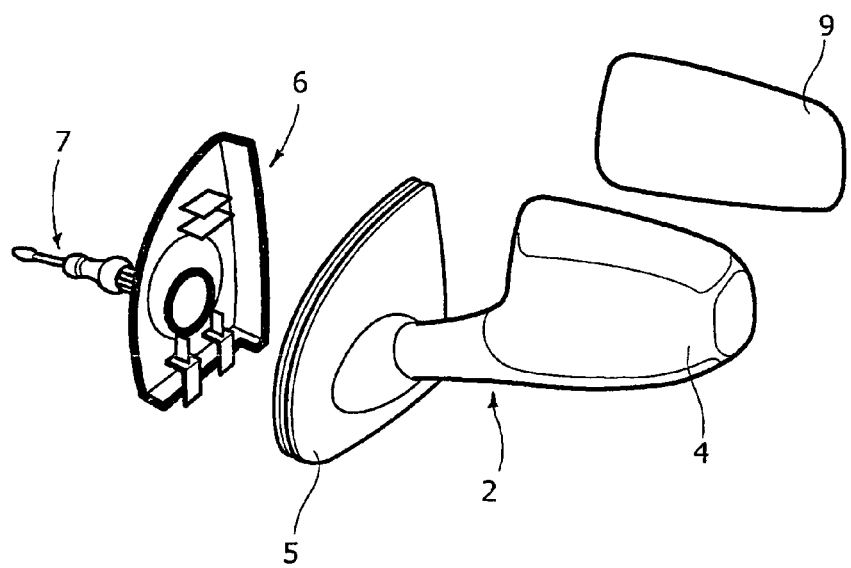
FIG. 2 is an exploded perspective view of the rearview-mirror unit according to the invention.
Figure 3:
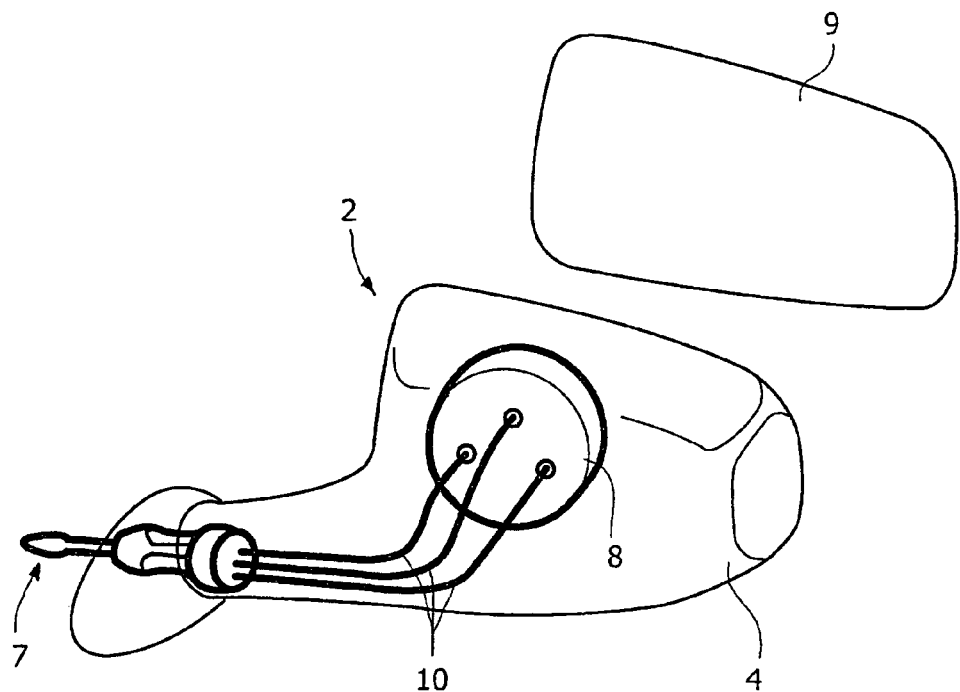
FIG. 3 is a perspective view which shows some fundamental elements of the rearview-mirror unit according to the invention.
Figure 4:
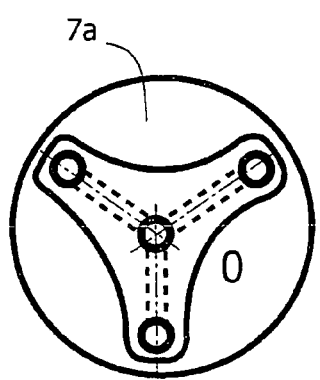
FIG. 4 is a schematic front view of a component of the rearview-mirror unit according to the invention.

With reference to FIG. 2, the mirror unit 2 comprises a mirror body 4 supported by a base 5, which is fixed on the outer surface of the motor vehicle in a position corresponding to the front bottom vertex of the side window 3. Fixed to the base 5 in a corresponding position inside the motor vehicle, or more precisely on the inside of the side door of the motor vehicle, is a counter-base 6 from which the lever 7 for controlling the movement of adjustment of the mirror projects. Within the mirror body 4, a support 8 (FIG. 3) is mounted in any known way, via means not illustrated, so that it can oscillate, a reflecting plate 9 being fixed to said support. Of course, according to the conventional art, the mirror body 4 can be connected to the supporting base 5 in an articulated way to enable displacement of the entire mirror body 4 between an operative position and an inoperative position rotated up against the frame of the motor vehicle.

With reference to FIGS. 3-6, the movement of oscillation of the support 8 of the plate 9 can be controlled by actuating one or more of the three shape-memory wires 10. In the case of the example illustrated, the three shape-memory wires 10 each have one end rigidly connected to the support 8 and are guided within respective sheaths 10a.

In the simplest theoretical solution, the control lever 7, which projects inside the passenger compartment of the motor vehicle and is of the joy-stick type, has a central neutral position and three peripheral positions corresponding respectively to actuation of a respective shape-memory wire 10. For this purpose, the lever is connected to an oscillating disk 7a, which is able to activate with its oscillation one or more of the three switches 11. The drawings illustrate the contacts of the switches 11 only schematically. It will be quite evident, however, to persons skilled in the branch, how said contacts could be controlled by the lever 7 so as to be activated individually or simultaneously to generate any movement of oscillation of the plate 9 of the mirror.

Figure 6:
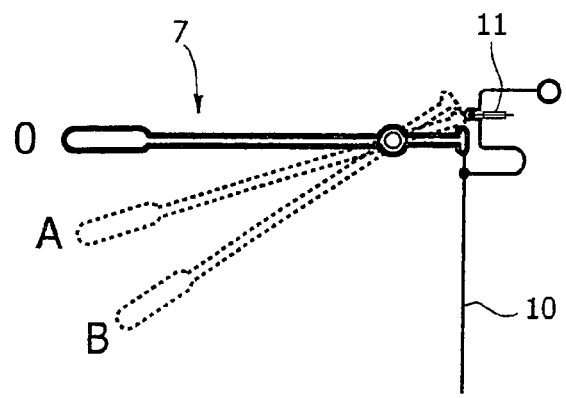
FIG. 6 is a further view of a detail of FIG. 5.

As illustrated schematically in FIG. 6, preferably, for each shape-memory wire 10, the control lever 7 has a first position of activation A, which corresponds to activation of a corresponding electrical switch and consequently to supply of electrical current to the respective shape-memory wire 10 to enable change of state thereof. Proceeding in its rotation, however, the lever 7 can be brought up to a position B which is beyond the position A, in which it actuates in any case the movement of the plate 9 using the respective wire 10 as a simple flexible cable for mechanical transmission. Consequently, a particularly preferred characteristic of the present invention is to provide shape-memory actuating means that will be able to function also as a simple mechanical transmission in the case of failure of the electrical supply.

Of course, without prejudice to the principle of the invention, the details of construction and the embodiments may vary widely with respect to what is described and illustrated herein purely by way of example, without thereby departing from the scope of the present invention.

What is claimed is:

1. An outer rearview-mirror unit for a motor vehicle, comprising:
    a mirror body;
    a base element supporting the mirror body, said base element mounted on the outer surface of the motor vehicle, at a front bottom vertex of a side window of the motor vehicle;
    a counter-base element fixed to said base element at a corresponding position on the inside of a side door of the motor vehicle;
    a reflecting plate;
    a support for said reflecting plate which is pivotally supported by said body of the mirror;
    a single control lever for controlling the position of said reflecting plate relative to said mirror body, said lever being supported by, and projecting from, said counter-base element inside a passenger compartment of the motor-vehicle,
    wherein said lever is part of an electrical switching device and has a number of positions, for controlling electrical supply to a plurality of shape-memory wires connected to said support for the reflecting plate, in order to orient the reflecting plate relative to said mirror body by means of a change of state of each shape memory wire caused by a passage of electric current.

2. The mirror unit according to claim 1, wherein the control lever of the electrical switching device has a neutral position and a plurality of peripheral positions of actuation of one or more of the shape-memory wires.

3. The mirror unit according to claim 2, wherein for each shape-memory wire the control lever has a position of mechanical actuation, located beyond the position of electrical actuation.

4. The mirror unit according to claim 3, wherein the control lever is of the joy-stick type.

* * * * *